3,051,764
HALOGENATED ORGANIC COMPOUNDS
Murray Hauptschein, Glenside, and Milton Braid, Philadelphia, Pa., and Francis E. Lawlor, Mesa, Ariz., assignors to Pennsalt Chemicals Corporation, Philadelphia, Pa., a corporation of Pennsylvania
No Drawing. Filed May 13, 1958, Ser. No. 734,841
18 Claims. (Cl. 260—653.1)

This invention relates to telomers prepared from the olefin $CF_2=CHCl$ and is particularly concerned with valuable oils and greases derived from such telomers. These oils and greases have valuable uses as lubricants which are stable at high temperatures and under other conditions which normally lead to rapid deterioration of hydrocarbon oils.

Telomers prepared from a variety of haloethylenes are known. For example, telomer oils prepared from the olefin $CF_2=CFCl$, such as those described in U.S. Patent 2,770,659, are well known and in commercial use. While synthetic oils prepared from this olefin have excellent properties in many respects, these oils tend to be high in cost partly because of the relatively high cost of the olefin $CF_2=CFCl$. Furthermore, these perhalo oils have the disadvantage of relatively high volatility for a given viscosity. Their relatively high volatility is particularly disadvantageous in applications requiring a relatively light, low viscosity oil since they tend to evaporate rapidly at relatively low temperatures.

Telomers prepared from the olefin $CF_2=CF_2$ are also known. These are described by Haszeldine, Journal of the Chemical Society 3559 (1953), who prepared telomers such as those of the series $CF_3(CF_2CF_2)_nI$ where the average value of $n$ may vary, for example, from 1 to 20. Telomers of this type, however, do not produce satisfactory oils useful as lubricants. The low molecular weight liquid members of the series are low boiling and of very low viscosity and have little or no utility as lubricants. As the molecular weight increases solids rather than oils of lubricant viscosity are produced. Many homotelomers prepared from the olefin $CH_2=CF_2$, such as telomers of the series $CF_3(CH_2CF_2)_nCl$ are subject to this same disadvantage.

It has now been found that valuable telomers having excellent properties as lubricants, hydraulic fluids and the like, may be produced from the olefin difluorovinylchloride, viz. $CF_2=CHCl$. This olefin, having a lower percentage of fluorine, is inherently less expensive than the perhalo olefins. Despite the presence of the hydrogen in this olefin, the oils produced therefrom have surprisingly high heat stability and stability against corrosive reagents. The telomers produced from this olefin furthermore, are liquids over a relatively wide range of molecular weights thus making possible the production of lubricant oils having a wide range of viscosities. The oils obtained likewise have good viscosity-temperature characteristics, that is to say, the rate of change of viscosity with temperature is relatively low in contrast to perfluorocarbon oils. Still another advantage of the lubricant oils produced from this olefin is their relatively low volatility for a given molecular weight and corresponding viscosity.

Besides having utility as synthetic, high temperature stable lubricants and the like, telomers of the invention produced from the olefin $CF_2=CHCl$ are also useful as intermediates for the production of a new series of aldehydes containing the repeating $(CF_2CHCl)$ unit through the formation of an intermediate halosulfate, as will be described hereinafter.

The telomers of the invention are produced by reacting the olefin $CF_2=CHCl$ at a temperature between 150° and 300° C. with one of the following telogen iodides: ICl, $RCX_2I$, $R_2CXI$ or $RCX_2CHXI$ where R may be fluorine, chlorine or a halogenated organic radical from the group consisting of perfluoro, perchloro, perfluorochloro, perfluorohydro, perfluorochlorohydro and perchlorohydro radicals and where X may be fluorine or chlorine. Where R or X occurs twice in any of these formulae, they may be the same or different. Where R is a halogenated organic radical, it is preferably an alkyl radical containing from 1 to 3 carbon atoms.

The terms (a) perfluoro, (b) perchloro, (c) perfluorochloro as used herein mean respectively (a) containing only carbon and fluorine; (b) containing only carbon and chlorine; (c) containing only carbon, fluorine and chlorine. The terms (d) perfluorohydro, (e) perchlorohydro, (f) perfluorochlorohydro mean respectively, (d) containing only carbon, fluorine and hydrogen in which the molar ratio of fluorine:hydrogen is at least 1:1; (e) containing only carbon, chlorine and hydrogen in which the molar ratio of chlorine:hydrogen is at least 1:1; and (f) containing only carbon, fluorine, chlorine and hydrogen in which the molar ratio of fluorine plus chlorine: hydrogen is at least 1:1.

The preferred telogens are ICl, and those in which R is chlorine, fluorine or a perfluoroalkyl, a perfluorochloroalkyl, a perfluorohydroalkyl or a perfluorochlorohydroalkyl radical containing from 1 to 3 carbon atoms.

As will be discussed more in detail hereafter, iodine monochloride (ICl) and the iodide $CF_2ClCHClI$ (obtained by adding ICl to the olefin $CF_2=CHCl$) are especially preferred telogens from the standpoint of producing excellent lubricant oils at relatively low cost.

Specific telogens that may be reacted with the olefin $CF_2=CHCl$ to produce the telomers of the invention are ICl, $CF_3I$, $C_2F_5I$, $C_3F_7I$, $C_2F_5CF(CF_3)I$, $C_4F_9CF(CF_3)I$, $C_4F_9CF(CF_3)CF_2CF(CF_3)I$, $CF_2ClCHClI$, $CF_2ClCFClI$, $CF_2ClCF_2I$, $CF_3CHClI$, and

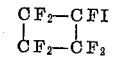

The reaction of the above telogen iodides with $CF_2=CHCl$ to produce the telomers of the invention requires relatively high temperatures of at least 150° C. and preferably at least 175° C. The reaction does not proceed to any appreciable extent at lower temperatures even in the presence of ultraviolet light or catalysts such as peroxides; at lower temperatures substantially the only product formed is the 1:1 olefin to iodide adduct. This is in contrast to olefins of the type $CF_2=CF_2$, $CF_2=CFCl$, and $CH_2=CF_2$, which undergo telomerization reactions with a telogen iodide such as $CF_3I$ at relatively low temperatures in the presence of ultraviolet light or peroxide catalysts, temperatures ranging from room temperature or slightly above, e.g. 20° C. in presence of ultraviolet being sufficient for these reactions.

Although the invention does not depend upon any particular explanation of reaction mechanism, it is believed highly probable that the reaction between telogen iodides and the olefin $CF_2=CHCl$ proceeds in an entirely different manner from the reaction between such telogens and the olefins $CF_2=CFCl$, $CF_2=CF_2$, $CH_2=CF_2$. In the case of the latter olefins, it is believed that the telomer chain is built up in large part by almost instantaneous reaction between the growing telomer radical and successive molecules of olefin. That is to say, upon the generation of a free radical such as by the disassociation of $CF_3I$ into $CF_3\cdot +I\cdot$ a number of olefin molecules add successively through a rapid chain reaction mechanism, e.g.

(1) $CF_3\cdot + CF_2=CF_2 \rightarrow CF_3CF_2CF_2\cdot$
(2) $CF_3CF_2CF_2\cdot + n(CF_2=CF_2) \rightarrow$
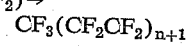

In the case of the thermal reaction of the olefin $CF_2=CHCl$ with a telogen iodide on the other hand, instead of chain propagation taking place through reaction between a growing telomer radical and successive molecules of olefin, as in the reactions illustrated above, step-wise addition is believed to take place with the telomeric iodo-compound being formed in each case. Even in the presence of very large excesses of olefin, no evidence of free radical chain propagation is observed; after a short time essentially the only product formed is the 1:1 adduct of the olefin. The 1:1 adduct is thus the precursor of the 2:1 adduct which in turn is the precursor of the 3:1 adduct etc.

This is illustrated in the reaction of $CF_3I$ with $CF_2=CHCl$:

(3) $CF_3I + CF_2=CHCl \rightarrow CF_3CF_2CHClI$
(4) $CF_3CF_2CHClI + CF_2=CHCl \rightarrow CF_3(CF_2CHCl)_2I$
(5) $CF_3(CF_2CHCl)_2I + CF_2=CHCl \rightarrow$
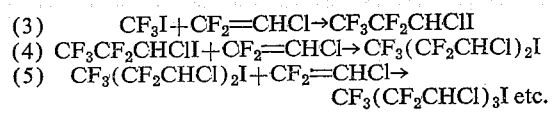

It is undoubtedly due to the fact that the reaction proceeds by a step-wise addition, rather than by chain propagation between the telomer radical and successive molecules of olefin, that relatively long reaction periods and relatively high temperatures are required in order to produce the telomers of the invention containing a plurality of olefin units.

While the reaction temperature should be at least 150° C. it should generally not be above about 300° C. Generally the most desirable reaction temperatures lie in the range of from 175° C. to 225° C.

The reaction should be carried out under super-atmospheric pressures. A minimum pressure of 100 lbs./in.$^2$ gage is generally required. There is no critical upper limit to the reaction pressure other than limits imposed by the strength of the reactor, cost and the like. Thus, while pressures up to about 50,000 lbs./in.$^2$ gage may be employed, it is preferred to operate within the range of about 500 pounds to about 10,000 lbs./in.$^2$ gage.

Neither the reaction time nor the molar ratio of telogen to olefin are critical with respect to determining whether or not the reaction will take place. These conditions, however, are important with respect to the type of product that is produced, and with respect to the yield of the desired product from the reaction. In general, the higher the olefin:telogen iodide molar ratio up to a practical limit of e.g. 10:1, and the longer the reaction time, the higher will be the tendency to produce products of higher molecular weight. Low olefin:telogen molar ratios and short reaction times tend to favor the formation of primarily low molecular weight products such as the 1:1 or 2:1 olefin to iodide adduct which in general are low viscosity liquids having little or no utility as lubricants, hydraulic fluids or the like.

Thus, to produce telomers having utility as lubricants an excess of the olefin should be employed, molar ratios of olefin. iodide of from 2:1 to 10:1, and particularly 3:1 to 8:1, being preferred. Reaction periods of at least three hours and as long as two weeks or more are required to produce the desired products. Generally, reaction periods of from 20 hours to 150 hours are preferred.

It will be appreciated, of course, that the optimum reaction conditions will vary depending upon the particular product desired. The optimum reaction conditions, however, in any particular case may be readily chosen in light of the general teachings above and of the specific examples which follow.

The reaction may conveniently be carried out in an autoclave which is preferably constructed of a corrosion resistant metal because of the corrosive nature of some of the reactants and/or reaction products. After charging the autoclave with the olefin and telogen iodide it is sealed and heated to and maintained at the reaction temperature preferably with shaking or stirring. After the reaction period, the autoclave is cooled, and unreacted olefin and other volatile materials vented and recovered by condensation in appropriately cooled receivers. The telomer iodides may be separated from unreacted starting iodide, and may be separated into the desired fractions, by distillation usually under vacuum.

Ordinarily, some low molecular weight products, such as the 1:1 or 2:1 olefin to starting iodide adduct will be obtained together with higher molecular weight products. If desired, after separating these lower molecular weight telomer iodides from the desired higher products they may be reacted with further quantities of the olefin $CF_2=CHCl$ and by this procedure converted into higher molecular weight telomers.

In carrying out this reaction, control over the molecular weight of the products is readily obtained by choice of reaction time. Facile control over the molecular weight of the products by varying reaction time is a salient feature of the invention. In this way it is possible to obtain products which consist almost entirely of liquid oils of desirable lubricant viscosity. Control of the molecular weight of the product in this manner is a technique not available in the case of the telomerization of the olefins $CF_2=CF_2$, $CH_2=CF_2$, $CF_2=CFCl$ probably because of the fact that only in the case of $CF_2=CHCl$ does the telomerization proceed almost exclusively by step-wise addition.

For use as lubricants, hydraulic fluids and the like the telomer iodides produced as described above are desirably treated to improve their stability by the removal of iodine. This may be accomplished by replacing iodine with another halogen, preferably fluorine or chlorine or through a coupling reaction by loss of the terminal iodine from two telomer molecules, followed by coupling of the two resulting radicals.

Replacement of the iodine of the telomer by a chlorine atom may be accomplished by direct chlorination with elemental chlorine at pressures ranging from atmospheric to 50,000 lbs./in.$^2$ gage and preferably from atmospheric to 500 lbs./in.$^2$ gage.

Chlorination may proceed at room temperatures in the presence of ultraviolet light and at elevated temperatures up to e.g. 270° C. but preferably from about 140° to 225° C. These chlorinations may be carried out with no substitution in the telomer molecule. Replacement of the iodine by a fluorine atom may be accomplished by reacting the telomer iodide with conventional fluorination agents such as $SbF_3Cl_2$.

Coupling of the telomer iodide may be accomplished by means of ultraviolet irradiation in the presence of metallic mercury at room temperature. Thus, the telomer iodide $CF_3(CF_2CHCl)_nI$ may be coupled in accordance with the following reaction:

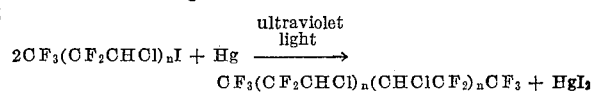

This coupling reaction, and products of this general class are described in the co-pending applications of R. N. Haszeldine Serial No. 377,716, filed August 31, 1953, and now abandoned, and Serial No. 680,915, filed August 29, 1957.

The telomers of the invention may be represented by the following general formulae:

$R'(CF_2CHCl)_nQ$ and $R'(CF_2CHCl)_n(CHClCF_2)_mR'$ where $R'$ may be a perfluoro, perchloro, perfluorochloro, perfluorohydro, perfluorohydrochloro, or a perchlorohydro radical; where Q is halogen (i.e. chlorine, fluorine, bromine, or iodine), and where $n$ and $m$ are integers of the series, 1, 2, 3, 4, 5, etc., the value of $n$ in the telomers $R'(CF_2CHCl)_nQ$ being at least 3 and preferably in the range of from 3 to 20 inclusive; and the value of $n+m$ in telomers of the series $R'(CF_2CHCl)_n(CHClCF_2)_mR'$ similarly being at least 3, and preferably in the range of from 3 to 20 inclusive. Where R′ occurs more than once in the molecule it may be the same or different. The integers $n$ and $m$ may likewise be the same or different.

R′ is preferably a perfluoroalkyl, a perfluorochloroalkyl, a perfluorohydroalkyl, or a perfluorohydrochloroalkyl radical preferably having from 1 to 3 carbon atoms.

In the case of the telomers R′(CF$_2$CHCl)$_n$Q, Q is preferably chlorine or fluorine (through replacement of iodine by fluorine or chlorine) since such telomers are much more stable at high temperatures in the presence of the reactive agents such as oxygen than those containing iodine or bromine. Most desirably Q is chlorine, because of cost and relative ease of chlorination.

Expressed in terms of molecular weight, the preferred telomers are those in which the value of $n$ in the non-coupled telomers, or the value of $n+m$ in the case of the coupled telomers, is in the range of from 3 to 10 inclusive. Compounds having this range of chain length are predominantly liquids at room temperature or soft solids, all of which have good to excellent lubricant properties. For lubricant oils the most desirable telomers are those which consist predominantly of compounds in which the value of $n$ in the case of the non-coupled telomers, or the value of $n+m$ in the case of the coupled telomers lies in the range of from 3 to 7 inclusive. Such oils are liquids at room temperature having excellent lubricant viscosities.

It should be pointed out that as is true in all telomerization reactions, a mixture of products of varying chain length is invariably produced, although as previously pointed out it is possible to control the telomerization to produce products within narrow molecular weight ranges. Thus, the product of a typical reaction may contain some low molecular weight products such as the 1:1 or 2:1 olefin-to-iodide adduct, together with a mixture of products containing e.g. from 3 to 7 (CF$_2$CHCl) units. After topping to remove the undesired low molecular weight products, an oil of desired viscosity can be obtained by fractional distillation of the product and/or by mixing lighter and heavier liquid fractions from various runs. Thus, oils of any desired viscosity over wide ranges, e.g. stabilized oils having viscosities of from 30 to 2500 centistokes at 100° F. may be obtained. Likewise, by preparing a mixture of a waxy higher fraction (such as one containing from 12 to 16 (CF$_2$CHCl) units) with a lower molecular weight liquid oil, light, heavy, or intermediate weight lubricant greases may be obtained. On the other hand, the entire topped product from a given reaction, containing e.g. predominantly telomers having from 4 to 6 CF$_2$CHCl units per molecule may be employed as is. Although it is not ordinarily necessary nor economical to separate out individual compounds this may be done if desired. It is understood that both the individual compounds and the mixtures of individual compounds of varying chain length are intended to be included within the scope of the appended claims.

In the telomers of the above general formulae, the olefin units add predominantly in the manner shown, that is, with an R′(CF$_2$CHCl—) unit at one end, and a (—CF$_2$CHClQ) unit at the other end of the molecule, with the olefin units in the intermediate portion of the molecule adding head to tail in the same manner, such as in the telomer CF$_3$—CF$_2$CHCl—CF$_2$CHCl—CF$_2$CHCl—CF$_2$CHCl—I A minor portion of the product may however consist of isomeric products or products of slightly varying structure. It is to be understood that the claims are intended to cover products containing telomers which are predominantly of the structure as shown but which may also include minor amounts of such other products.

The telomers of the invention having desirable properties as lubricants, hydraulic fluids and the like may also be defined in terms of their boiling point range. Telomers having these valuable uses are those having a boiling point range of from 80° C. to 300° C. at a pressure of about 0.1 mm. Hg. This range includes both liquid oils of useful lubricant viscosities and waxy solids which are also useful as lubricants either as waxes or as greases when compounded with lower molecular weight liquid oils. The oils which are liquids at room temperature and of optimum lubricant viscosity are those which boil between 100° C. and 250° C. at a pressure of about 0.1 mm. Hg.

The reaction of CF$_2$=CHCl with iodine monochloride (ICl) is a particularly advantageous embodiment of the invention. Although the invention does not depend upon any particular explanation of the reaction mechanism, it is believed that the reaction occurs through the formation of the telogen CF$_2$ClCHClI in situ through the addition of ICl to the olefin CF$_2$=CHCl, and that this telogen then reacts with additional molecules of olefin to produce telomers. This particular reaction has the advantage that both the olefin and the telogen (ICl) are relatively inexpensive materials.

The use of the telogen CF$_2$ClCHClI is also highly advantageous since this telogen is readily prepared by the addition of iodine monochloride to CF$_2$=CHCl at temperatures of from 30° to 100° C. (substantially lower than is required for telomer formation) and at pressures ranging from 50 to 1000 lbs./in.$^2$ gage. This procedure differs from the one described above only in that the telogen CF$_2$ClCHClI is prepared separately rather than in situ. This embodiment also has the advantage that the original starting materials, ICl and the olefin CF$_2$=CHCl are both relatively inexpensive materials.

When either iodine monochloride or CF$_2$ClCHClI are employed as telogens, the telomer iodides produced have the general formula:

CF$_2$ClCHCl(CF$_2$CHCl)$_n$I these telomer iodides may be stabilized by the substitution of a chlorine or fluorine atom in the place of the iodine atom to produce telomers of the series:

CF$_2$ClCHCl(CF$_2$CHCl)$_n$Cl and

CF$_2$ClCHCl(CF$_2$CHCl)$_n$F or may be coupled by the procedure described above to produce products of the general formula:

CF$_2$ClCHCl(CF$_2$CHCl)$_n$(CHClCF$_2$)$_m$CHClCClF$_2$

In the above general formulae $n$ and $m$ are as defined above with the same preferred values.

*Example 1.—Synthesis of Telomers of 1-Chloro-2,2-Difluoroethylene With Iodine Monochloride*

A mixture of 71.5 (0.44 mole) of iodine monochloride (ICl) and 260 grams (2.64 moles) of 1-chloro-2,2-difluoroethylene (CF$_2$=CHCl) (6:1 molar ratio of olefin to iodide) is heated at 195° for 69 hours during which the pressure drops from 2200 to about 200 p.s.i. There is recovered from this reaction 85 grams of volatile material, mainly unreacted olefins. The remaining products are fractionated by distillation and the following fractions are collected:

(1) 80 grams of a liquid having a boiling range up to 103° C. at 100 mm. Hg containing appreciable amounts of the 1:1 adduct of ICl to the olefin, CF$_2$ClCHClI.

(2) 70 grams of a pink slightly viscous liquid consisting mainly of CF$_2$ClCHCl(CF$_2$CHCl)I having a boiling range of from 103° C. at 100 mm. Hg to 60° C. at about 0.1 mm. Hg.

(3) 30 grams of a pink moderately viscous oil, mainly CF$_2$ClCHCl(CF$_2$CHCl)$_2$I having a boiling range of from 60° C. to 90° C. at about 0.1 mm. Hg and a refractive index $n_D^{25}$ of 1.456.

(4) 20 grams of a viscous pink oil largely $$CF_2ClCHCl(CF_2CHCl)_{3\ av}I$$

having a boiling range of from 90° C. to 110° C. at about 0.1 mm. Hg and a refractive index $n_D^{25}$ 1.458.

(5) 15 grams of a viscous pink oil mainly $$CF_2ClCHCl(CF_2CHCl)_{4\ av}I$$

and containing mostly telomers of chain length ranging from $CF_2ClCHCl(CF_2CHCl)_3I$ to $$CF_2ClCHCl(CF_2CHCl)_6I$$

having a boiling range of from 110° C. to 162° C. at about 0.1 mm. Hg and a refractive index $n_D^{25}$ 1.460.

(6) A residue of an orange viscous oil consisting of telomers ranging in chain length from $$CF_2ClCHCl(CF_2CHCl)_6I\ \text{to}\ CF_2ClCHCl(CF_2CHCl)_{10}I$$

having a boiling point greater than 162° C. at 0.1 mm. Hg.

*Example 2.—Synthesis of Telomers of 1-Chloro-2,2-Difluoroethylene With Iodine Monochloride*

71.5 grams (0.44 mole) of (ICl) and 304 grams (3.08 moles) of $CF_2=CHCl$ are heated at 200° C. for 26 hours during which the pressure drops from 6500 to 1900 lbs./in.² gage. There are obtained from this reaction 154 grams of volatiles mainly unreacted olefin, and 177 grams of material consisting of $CF_2ClCHClI$ and telomer iodides of the general formula $CF_2ClCHCl(CF_2CHCl)_nI$ where $n$ varies from 1 to about 6. The last fraction has a boiling range of from 108–118° C. at about 0.1 mm. Hg is a viscous pink oil. These telomer iodides are recycled with additional olefin by the following procedure.

224 grams (2.27 moles) of $CF_2=CHCl$, the 177 grams of $CF_2ClCHClI$ and telomer iodide $$CF_2ClCHCl(CF_2CHCl)_nI$$

obtained as above described are heated at 200° C. for about 20. During this period the pressure drops from 7000 to 3000 lbs./in.² gage. One hundred thirty-six grams of volatile materials, mainly unreacted olefin, and about 100 grams of liquid having a boiling range up to 40° C. at 0.1 mm. Hg containing a large amount of $CF_2ClCHClI$ are recovered from this reaction. In addition higher boiling products are obtained from which are collected by fractional distillation the following fractions:

(1) 60 grams of a liquid mostly $$CF_2ClCHCl(CF_2CHCl)I$$

having a boiling range of from 40° C. to 60° C. at about 0.1 mm. Hg.

(2) 35 grams of a liquid mostly $$CF_2ClCHCl(CF_2CHCl)_2I$$

having a boiling range of 60° C. to 90° C. at about 0.1 mm. Hg.

(3) 30 grams of a liquid largely $$CF_2ClCHCl(CF_2CHCl)_{3\ av}I$$

having a boiling range of from 90° C. to 114° C. at about 0.1 mm. Hg.

(4) 25 grams of a pink viscous oil mainly $$CF_2ClCHCl(CF_2CHCl)_{6\ av}I$$

having a boiling range of from 114° C. to greater than 170° C. at about 0.1 mm. Hg and mainly boiling at 157° C. at 0.1 mm. Hg. *Analysis.*—Calculated: $C_{15}$, $F_{15}$, $Cl_{8.5}$, $H_{7.5}I$: C, 19.9; I, 14.1. Found: C, 20.1; I, 14.1.

(5) A high boiling residue, consisting of telomers ranging in chain length from $CF_2ClCHCl(CF_2CHCl)_7I$ to $CF_2ClCHCl(CF_2CHCl)_{15}I$.

*Example 3.—Synthesis of Telomers of 1-Chloro-2,2-Difluoroethylene with 1,2-Dichloro-2,2-Difluoro-1-Iodoethane*

Forty-three grams (0.165 mole) of 1,2-dichloro-2,2-difluoro-1-iodoethane and 67 grams (0.680 mole) of 1-chloro-2,2-difluoroethylene (4.1:1 molar ratio of olefin to iodide) are heated in a 130 cc. Monel autoclave at 190–200° C. for 135 hours during which the pressure drops from 500 to less than 100 lbs./in.² gage. There is recovered from this reaction 24 grams of volatile materials condensed in a Dry Ice-cooled receiver, mainly unreacted olefin. The remaining 77 grams of products are fractionally distilled, and after removal of material boiling up to 40° C. at 0.1 mm. Hg consisting mainly of unreacted iodide, the following fractions are collected:

(1) 15 grams of a liquid consisting substantially of $CF_2ClCHCl(CF_2CHCl)I$ having a boiling range of from 40° C. to 60° C. at about 0.1 mm. Hg.

(2) 18 grams of a pink oil of medium viscosity largely $CF_2ClCHCl(CF_2CHCl)_2I$ having a boiling range of from 60° C. to 90° C. at about 0.1 mm. Hg.

(3) 10 grams of a viscous pink oil largely $$CF_2ClCHCl(CF_2CHCl)_{3\ av}I$$

having a boiling range of 90° C. to 108° C. at about 0.1 mm. Hg having a refractive index $n_D^{28}$ 1.457.

(4) A residue consisting of a viscous orange oil containing telomers of chain length varying from $$CF_2ClCHCl(CF_2CHCl)_3I\ \text{to}\ CF_2ClCHCl(CF_2CHCl)_6I$$

having a boiling range greater than 108° C. at about 0.1 mm. Hg.

The infrared spectra of all of the telomer iodides formed in the reactions of $CF_2=CHCl$ either with $CF_2ClCHClI$ directly or with $CF_2ClCHClI$ formed in situ by addition of iodine monochloride to $CF_2=CHCl$ or by reaction of additional $CF_2=CHCl$ with lower olefin:iodide adducts are similar and show the following common characteristic absorption maxima: 7.40±.02, 8.21±.01, 8.75±.02, 8.88±.02, 9.68±.04, 9.84±.06, 10.26±.01, 11.26±.03, 12.18±.04, 12.42±.03, 14.32±.13, and 14.9μ.

*Example 4.—Synthesis of Telomers of 1-Chloro-2,2-Difluoroethylene with 1-Iodoperfluoropropane*

Fifty-nine moles (0.199 mole) of 1-iodoperfluoropropane and 187 grams (1.90 moles) of 1-chloro-2,2-difluoroethylene (9.56:1 olefin:iodide molar ratio), are heated with shaking at 187° C. for 65 hours. The pressure drops from 1700 to 800 p.s.i. during this time, about half the drop occurring during the first 20 hours. There are recovered from this reaction 137 grams of volatile materials mainly unreacted $CF_2=CHCl$ and about 15 grams of $CF_3CF_2CF_2I$. The remaining 90 grams (75% conversion based on $C_3F_7I$) of telomer iodides of the structure $C_3F_7(CF_2CHCl)_nI$ are fractionated and the following fractions are collected:

(1) 10 grams of $C_3F_7(CF_2CHCl)I$, the middle cut of which has a boiling range of 81 to 83° C. at about 100 mm. Hg and a refractive index $n_D^{32}$ 1.3796. *Analysis.*—Calculated for $C_5HF_9ClI$: C, 15.2; H, 0.26. Found: C, 15.2; H, 0.40.

(2) 25 grams of $C_3F_7(CF_2CHCl)_2I$ the middle cut of which has a boiling range of 130° C.–135° C. at 100 mm. Hg and a refractive index $n_D^{31}$ 1.3957. *Analysis.*—Calculated for $C_7H_2F_{11}ClI$: C, 17.1; H, 0.40. Found: C, 17.0; H, 0.47.

(3) 20 grams of $C_3F_7(CF_2CHCl)_{3\ av}I$ having a boiling range of 120° C. at 20 mm. Hg to 50° C. at about 0.1 mm. Hg. The subscript 3 av means that the product is a mixture of varying chain lengths containing an average of 3 ($CF_2CHCl$) units per molecule.

(4) 17 grams of $C_3F_7(CF_2CHCl)_{4\ av}I$ having a boiling range of 50° to 110° C. at about 0.1 mm. Hg.

(5) 10 grams of $C_3F_7(CF_2CHCl)_{5\ av}I$ containing from 4 to 10 ($CF_2CHCl$) units per molecule and having a boiling range of from 110° C. to greater than 160° C. at about 0.1 mm. Hg.

The infrared spectra of these fractions are of a similarity expected for telomer iodides of an homologous series and all exhibited the following characteristic absorption bands: 7.39±.06, 7.80±.05, 8.12±.03, 8.80, 9.78±.05, 10.30±.04, 10.78±.05 (missing in $n=1$), 11.28±.06, 12.20±.04, 13.46±.07 (13.55 for $n=1$), 14.35±.11, and 14.9$\mu$.

*Example 5.—Synthesis of Telomers of 1-Chloro-2,2-Difluoroethylene with Iodoperfluoromethane*

A mixture of 100 grams (0.510 mole) of iodoperfluoromethane and 199 grams (2.02 moles) of 1-chloro-2,2-difluoroethylene (3.95:1 olefin:iodide molar ratio) is heated at 189° C. for about 70 hrs. during which the pressure drops from 2950 to 900 p.s.i. There is recovered from this reaction 155 grams of volatile materials consisting mainly of a mixture of unreacted $CF_2=CHCl$ and $CF_3I$. By fractional distillation of the remaining 135 grams of liquid products the following fractions (all liquids) are obtained:

(1) 20 grams (16 wt. percent) mainly the 1:1 olefin-to-iodide adduct $CF_3(CF_2CHCl)I$, having a boiling range of from 60° C. to 118° C. at 760 mm. Hg.

(2) 48 grams (39 wt. percent) largely the 2:1 olefin-to-iodide adduct $CF_3(CF_2CHCl)_2I$ having a boiling range of 40° C. to 100° C. at 20 mm. Hg and a refractive index $n_D^{27}$ 1.427.

(3) 20 grams (16 wt. percent) mostly

$CF_3(CF_2CHCl)_3I$ and $CF_3(CF_2CHCl)_4I$ having a boiling range of from 100° C. to 130° C. at 20 mm. Hg.

(4) 15 grams (12 wt. percent) mostly

$CF_3(CF_2CHCl)_5I$ having a boiling range of from 88° C to 120° C. at about 0.1 mm. Hg and a refractive index $n_D^{27}$ 1.433.

(5) 10 grams (8 wt. percent) largely $CF_3(CF_2CHCl)_6I$ having a boiling range of from 120° C. to 150° C. at about 0.1 mm. Hg and a refractive index $n_D^{27}$ 1.435.

(6) 9 grams (7 wt. percent) largely $CF_3(CF_2CHCl)_7I$ having a boiling range of from 150° C. to 195° C. at about 0.1 mm. Hg and a refractive index $n_D^{27}$ 1.438.

(7) 3 grams (2 wt. percent) containing telomers ranging from $CF_3(CF_2CHCl)_8I$ to $CF_3(CF_2CHCl)_{15}I$ having a boiling range of from 195° C. to greater than 230° C. at about 0.1 mm. Hg, $n_D^{27}$ 1.442.

The infrared spectra of these fractions are similar to those of the telomer iodides formed in the thermal reaction of $C_3F_7I$ with $CF_2=CHCl$ and consistent with an homologous series of telomer iodides. Characteristic absorption bands for all of these fractions are at 7.40±.03, 7.89±.03, 8.24±.01, 8.75±.01, 9.27±.04, 9.68±.02, 10.28±.02, 11.24±.02, 12.19±.04, 12.44±.02, 13.34±.04, 14.42±.02, and 14.9$\mu$.

*Example 6.—The Coupling of $C_3F_7(CF_2CHCl)_nI$ by Mercury and Ultraviolet Irradiation*

A mixture of 14 grams (0.021 mole) of

$C_3F_7(CF_2CHCl)_nI$ where $n=3.9$ av., 10 ml. of 1,2,2-trichlorotrifluoroethane and 8 ml. of mercury is sealed in a Vycor #7900 glass tube and irradiated under a Hanovia SH ultraviolet burner while shaking for about 5 days. The tube is opened and the contents are filtered. Several additional portions of 1,2,2-trichlorotrifluoroethane are used to extract the solids. After removal of the solvent from the combined filtrate and extracts, the remaining products are distilled at a pressure of about 0.1 mm. Hg to produce the following fractions consisting of mixed coupling products of the general formula $C_3F_7(CF_2CHCl)_n(CHClCF_2)_mC_3F_7$ including compounds where $n$ and $m$ are the same and where they are different:

(1) 2 grams of a colorless moderately viscous oil having a boiling range of from 90° C. to 140° C. at about 0.1 mm. Hg having a refractive index $n_D^{25}$ 1.391.

(2) 5.5 grams of a viscous slightly yellow oil having a boiling range of from 140° C. to 200° C. at about 0.1 mm. Hg, having a refractive index $n_D^{25}$ 1.405, and having main infrared absorption bands at 3.35$\mu$ 7.41$\mu$ (strong), 8.12$\mu$ (very strong), 8.80$\mu$ (very strong), 9.26$\mu$ (strong), 9.79$\mu$ (medium), 10.25$\mu$ (strong), 10.82$\mu$ (medium), 11.25$\mu$ (strong), 12.42$\mu$ (medium), 13.43$\mu$ (medium), 14.45$\mu$ (medium). This fraction, after one hour's heating in a sealed tube at 305° C. darkened only slightly, no change in viscosity being apparent.

(3) 1.5 grams of a slightly yellow heavy oil having a boiling range of from 200 to 210° C. at about 0.1 mm. Hg and a refractive index $n_D^{25}$ 1.409.

*Example 7.—Chlorination of $CF_2ClCHCl(CF_2CHCl)_nI$*

Twenty grams (0.031 mole) of

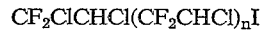
$CF_2ClCHCl(CF_2CHCl)_nI$ where the average value of $n$ is 6.5 is heated to 140° C. and chlorine is passed in for 5 hours. The temperature is raised to 180° C. and chlorination is continued for 8 hours at 180–200° C. No evolution of hydrogen chloride is detected, thus indicating that no substitution chlorination takes place in the telomer chain. The chlorinated telomer is distilled at reduced pressure and, after removal of chlorine and iodine chlorides, the following fractions are collected:

(1) 7.5 grams of a slightly yellow oil consisting mainly of $CF_2ClCHCl(CF_2CHCl)_{5\ av}Cl$ having a boiling range 140° C. to 170° C. at about 0.1 mm. Hg having a refractive index $n_D^{28}$ 1.436. This oil has the following viscosities:

(a) 277.5 centistokes at 100° F.
(b) 84.1 centistokes at 125° F.
(c) 34.1 centistokes at 150° F.
(d) 17 centistokes at 175° F.
(e) 10.1 centistokes at 200° F.
(f) 8.2 centistokes at 210° F.

The ASTM slope of this oil is 1.03 [determined by plotting the above value on ASTM Standard Viscosity-Temperature Charts for liquid petroleum products (D341–43)].

Analysis of this oil is as follows: Calculated for $C_{12}H_6Cl_8F_{12}$; C, 21.8; H, 0.92; Cl, 42.9. Found: C, 21.5; H, 0.95; Cl, 43.5.

(2) 6.5 grams of a slightly yellow oil consisting mainly of $CF_2ClCHCl(CF_2CHCl)_{6\ av}Cl$ having a boiling range 170° to 187° C. at about 0.1 mm. Hg. This oil has the following viscosities:

(a) 17,505 centistokes at 75° F.
(b) 1838 centistokes at 100° F.
(c) 388.4 centistokes at 125° F.
(d) 114.5 centistokes at 150° F.
(e) 44.9 centistokes at 175° F.
(f) 24.7 centistokes at 200° F.
(g) 17.4 centistokes at 210° F.

The ASTM slope of this oil is 1.05 (determined as described above).

Analysis of this oil is as follows: Calculated for $C_{14}H_7Cl_9F_{14}$: C, 22.1; H, 0.93, Cl, 42.0. Found: C, 21.8; H, 1.0; Cl, 42.3.

(3) 3 grams of a yellow viscous oil, solid below room temperature, mainly $CF_2ClCHCl(CF_2CHCl)_{7\ av}ICl$ having a boiling range of from 187° C. to greater than 195° C. at about 0.1 mm. Hg.

(4) A small residue undistilled at a still pot temperature of greater than 220° C. probably containing telomers ranging from $CF_2ClCHCl(CF_2CHCl)_6ICl$ to

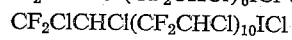
$CF_2ClCHCl(CF_2CHCl)_{10}ICl$

The infrared spectra of the fractions above are similar with the following characteristic absorption maxima: 7.36, 8.72, 8.85, 10.21, 11.20, 11.99 and 14.40$\mu$.

*Example 8.—Coupling of $CF_2ClCHCl(CF_2CHCl)_nI$ by Mercury and Ultraviolet Irradiation*

A mixture of 14 grams (0.028 mole) of $$CF_2ClCHCl(CF_2CHCl)_{2.5\,av}I$$

10 ml. of 1,2,2-trichlorotrifluoroethane and 8 ml. of mercury are sealed in a Vycor #7910 glass tube and irradiated by ultraviolet light provided by a Hanovia SH burner while shaking for about 5 days. After opening, the tube contents are filtered and the solids are extracted with several portions of 1,2,2-trichlorotrifluoroethane; extracts are combined with the filtrate. After removal of the solvent by distillation there are collected 8 grams of coupling products of the general formula:

$$CF_2ClCHCl(CF_2CHCl)_n(CHClCF_2)_mCHClCClF_2$$

including compounds where $n$ and $m$ are the same and where they are different, which are separated into the following fractions:

(1) 5 grams of a clear colorless oil having a boiling range of from 118° to 170° C. at about 0.1 mm. Hg and a refractive index $n_D^{26}$ 1.4322. This oil has the following viscosities:

470 centistokes at 100° F. (extrapolated)
140.5 centistokes at 125° F.
12.2 centistokes at 198° F.
9.6 centistokes at 210° F. (extrapolated)

The ASTM slope of this oil is 1.06 (determined as described above).

(2) 3 grams of a yellow oil having a boiling range of from 170° C. to 187° C. at about 0.1 mm. Hg and a refractive index $n_D^{26}$ 1.4358. This oil has the following viscosities:

4800 centistokes at 100° F. (extrapolated)
937.1 centistokes at 125° F.
36.4 centistokes at 198° F.
26 centistokes at 210° F. (extrapolated)

It has an ASTM slope of 1.03 (determined as described above).

The infrared spectra of these fractions are similar with the following common absorption maxima: 7.40±0.2, 8.02±.03, 8.23, 8.85±.03, 9.21, 9.52, 9.74, 10.24±.02, 10.80, 11.25, 12.08±.03, 12.5±.1, 13.85±.05μ.

The telomers of the invention are oils, greases and waxes which are non-flammable which have good thermal and chemical stability and which have excellent utility as lubricants hydraulic fluids, heat transfer liquids, damping fluids for use for example in gyroscopes, and the like. For such applications telomers which have been stabilized by coupling of the telomer iodide or by replacement of the iodine atom in the telomer iodide by chlorine or fluorine, and preferably chlorine, are much preferred since such telomers are more stable at elevated temperatures and in the presence of active agents.

The telomer oils of Examples 6, 7 and 8, particularly fractions 1 and 2 of Example 6, fractions 1, 2 and 3 of Example 7 and fractions 1 and 2 of Example 8, produced by stabilizing the iodide by coupling or chlorination, are exceptionally useful lubricants for use at elevated temperatures and under oxidative conditions. They may be used for example as compressor lubricants, high density lubricants for bearings submerged in water, lubricants for use in liquid or compressed oxygen systems. Heavier fractions are useful e.g. as stop-cock greases for laboratory equipment and the like.

The iodides themselves, although less stable are denser than the chlorides or fluorides and thus are excellent damping fluids in applications where exceptionally high thermal stability is not essential.

The telomer iodide of the inventions are also useful as intermediates for the production of halosulfates containing repeating $(CF_2CHCl)$ units as described and claimed in the copending application of Murray Hauptschein and Milton Braid for "Halogenated Organic Compounds," Serial No. 735,702 filed May 13, 1958. These halosulfates may be readily converted to a new series of aldehydes containing recurring $(CF_2CHCl)$ units as further disclosed in the above copending application.

We claim:

1. Telomers selected from the class consisting of those having the general formulae $R'(CF_2CHCl)_nQ$ and $R'(CF_2CHCl)_n(CHClCF_2)_mR'$ where R' is selected from the class consisting of perfluoro, perchloro, perfluorochloro, perfluorohydro, perfluorochlorohydro and perchlorohydro radicals; where Q is a halogen selected from the class consisting of iodine, chlorine and fluorine; where $n$ and $m$ are integers and where the value of $n$ in compounds of the formula $R'(CF_2CHCl)_nQ$ is at least 3 and where the value of $n+m$ in compounds of the formula $R'(CF_2CHCl)_n(CHClCF_2)_mR'$ is at least 3.

2. Telomers as defined in claim 1 where R' is selected from the class consisting of perfluoroalkyl, perfluorochloroalkyl, perfluorohydroalkyl and perfluorohydrochloroalkyl radicals having from 1 to 3 carbon atoms.

3. Telomers as defined in claim 2 where the value of $n$ in telomers of the formula $R'(CF_2CHCl)_nQ$ is from 3 to 10, and where the value of $n+m$ in telomers of the formula $R'(CF_2CHCl)_n(CHClCF_2)_mR'$ is from 3 to 10.

4. Telomers as defined in claim 1 in which the value of $n$ in telomers of the formula $R'(CF_2CHCl)_nQ$ is from 3 to 20 and where the value of $n+m$ in telomers of the formula $R'(CF_2CHCl)_n(CHClCF_2)_mR'$ is from 3 to 20.

5. Telomers having the general formula $$R'(CF_2CHCl)_nQ$$

where R' is selected from the group consisting of perfluoro, perchloro, perfluorochloro, perfluorohydro, perfluorochlorohydro and perchlorohydro radicals, where Q is a halogen selected from the group consisting of chlorine and fluorine and where $n$ is an integer, the value of $n$ being at least 3.

6. Telomers in accordance with claim 5 in which R' is selected from the class consisting of perfluoroalkyl, perfluorochloroalkyl, perfluorohydroalkyl and perfluorochlorohydroalkyl radicals having from 1 to 3 carbon atoms, where Q is chlorine and where the value of $n$ is from 3 to 20.

7. Telomers in accordance with claim 6 in which the value of $n$ is predominantly in the range of from 3 to 10.

8. Telomers selected from the class consisting of those having the general formulae: $CF_2ClCHCl(CF_2CHCl)_nQ$ and $CF_2ClCHCl(CF_2CHCl)_n(CHClCF_2)_mCHClCClF_2$ where Q is halogen selected from the class consisting of iodine, chlorine and fluorine and $n$ and $m$ are integers, the value of $n$ in the former telomers being from 3 to 20, and the value of $n+m$ in the latter telomers being from 3 to 20.

9. Telomers in accordance with claim 8 in which $n$ has a value of from 3 to 10 in the case of telomers of the formula $CF_2ClCHCl(CF_2CHCl)_nQ$ where $n+m$ has a value of 3 to 10 in the case of telomers of the formula $$CF_2ClCHCl(CF_2CHCl)_n(CHClCF_2)_mCHClCClF_2$$

10. Telomers having the general formula $$CF_2ClCHCl(CF_2CHCl)_nQ$$

where Q is a halogen selected from the group consisting of chlorine and fluorine and where $n$ is an integer, the value of $n$ being from 3 to 20.

11. Telomers in accordance with claim 9 in which Q is chlorine and in which $n$ has a value of from 3 to 10.

12. Telomers selected from the class consisting of those having the general formulae $R'(CF_2CHCl)_nQ$ and $$R'(CF_2CHCl)_n(CHClCF_2)_mR'$$

where R' is selected from the class consisting of perfluoro, perchloro, perfluorochloro, perfluorohydro, perfluorochlorohydro and perchlorohydro radicals; where Q is halogen selected from the class consisting of iodine, chlorine and fluorine and where $m$ and $n$ are integers, said telomers having a boiling range of from 80° C. to 300° C. at a pressure of 0.1 mm. Hg.

13. Telomer oils in accordance with claim 12 having a boiling range between 100° C. and 250° C. at 0.1 mm. Hg.

14. Telomers selected from the class consisting of those having the general formulae $CF_2ClCHCl(CF_2CHCl)_nQ$ and $CF_2ClCHCl(CF_2CHCl)_n(CHClCF_2)_mCHClCClF_2$ where $n$ and $m$ are integers and where Q is selected from the group consisting of chlorine and fluorine said telomers having a boiling range of from 80° to 300° C. at a pressure of 0.1 mm. Hg.

15. Telomer oils in accordance with claim 14 wherein Q is chlorine and wherein said telomer oils have a boiling range of from 100° C. to 250° C. at a pressure of 0.1 mm. Hg.

16. A method for producing telomers from the olefin $CF_2=CHCl$ comprising the steps of reacting said olefin at a temperature of 150° C. to 300° C. and under pressure of at least 100 lbs. 2 in. gage with a telogen iodide selected from the class of those having the formulae ICl, $RCX_2I$, $R_2CXI$, and $RCX_2CHXI$ where R is selected from the class consisting of fluorine, chlorine and perfluoro, perchloro, perfluorochloro, perfluorohydro, perfluorochlorohydro and perchlorohydro radicals; and where X is selected from the group consisting of chlorine and fluorine, and maintaining said reactants under said reaction conditions over a period of at least three hours.

17. A method in accordance with claim 16 in which said telogen is ICl, and in which the reaction temperature is from 175° C. to 225° C.

18. A method in accordance with claim 16 in which said telogen is $CF_2ClCHClI$ and in which the reaction temperature is from 175° C. to 225° C.

References Cited in the file of this patent
UNITED STATES PATENTS

| | | |
|---|---|---|
| 2,562,547 | Hanford et al. | July 31, 1951 |
| 2,700,661 | Miller | Jan. 25, 1955 |
| 2,766,299 | Schaff | Oct. 9, 1956 |
| 2,788,375 | Ehrenfeld | Apr. 9, 1957 |
| 2,833,831 | Haszeldine | May 6, 1958 |
| 2,875,253 | Barnhart | Feb. 24, 1959 |
| 2,880,247 | Miller | Mar. 31, 1959 |

FOREIGN PATENTS

| | | |
|---|---|---|
| 504,618 | Canada | July 27, 1954 |

OTHER REFERENCES

Haszeldine: Jour. Chem. Soc., London, 1952, pages 4423–4431.

Haszeldine et al.: Jour. Chem. Soc., London, May 1957, part 2, pages 2193–2196.

UNITED STATES PATENT OFFICE
CERTIFICATE OF CORRECTION

Patent No. 3,051,764                          August 28, 1962

Murray Hauptschein et al.

It is hereby certified that error appears in the above numbered patent requiring correction and that the said Letters Patent should read as corrected below.

Column 3, line 58, for "olefin. iodide" read -- olefin: iodide --; column 7, line 39, after "20" insert -- hours --; column 8, line 42, for "moles" read -- grams --; column 10, line 66, for the portion of the formula reading "$_{av}ICl$" read -- $_{av}Cl$ --; line 71, for the portion of the formula reading "$_6ICl$" read -- $_6Cl$ --; line 72, for the portion of the formula reading "$_{10}ICl$" read -- $_{10}Cl$ --; column 13, line 25, for "100 lbs. 2 in." read -- 100 lbs./in.$^2$ --.

Signed and sealed this 22nd day of January 1963.

(SEAL)
Attest:

ERNEST W. SWIDER                          DAVID L. LADD

Attesting Officer                           Commissioner of Patents